(12) United States Patent
Lorey (10) Patent No.: US 10,005,378 B2
(45) Date of Patent: Jun. 26, 2018

(54) DEVICE FOR SEAT STABILIZATION (71) Applicant: GRAMMER AG, Amberg (DE)

(72) Inventor: Konstantin Lorey, Schmidgaden (DE)

(73) Assignee: Grammer AG, Amberg (DE)

( * ) Notice: Subject to any disclaimer, the term of this patent is extended or adjusted under 35 U.S.C. 154(b) by 0 days. days.

(21) Appl. No.: 15/333,426

(22) Filed: Oct. 25, 2016

(65) Prior Publication Data
US 2017/0120787 A1    May 4, 2017

(30) Foreign Application Priority Data

Oct. 28, 2015 (DE) .......................... 10 2015 118 442

(51) Int. Cl.
| | |
|---|---|
| *B60N 2/10* | (2006.01) |
| *B60N 2/54* | (2006.01) |
| *B60N 2/50* | (2006.01) |
| *F16F 15/02* | (2006.01) |

(52) U.S. Cl.
CPC ............. *B60N 2/54* (2013.01); *B60N 2/502* (2013.01); *F16F 15/022* (2013.01)

(58) Field of Classification Search
CPC .......... B60N 2/502; B60N 2/54; F16F 15/022
USPC ............ 297/216.15, 216.16, 216.17, 216.18, 297/216.19, 216.2, 313, 314
See application file for complete search history.

(56) References Cited

U.S. PATENT DOCUMENTS

| | | | | | |
|---|---|---|---|---|---|
| 1,727,691 | A | * | 9/1929 | Baum ...................... | B60N 2/40 |
| | | | | | 297/314 X |
| 2,140,423 | A | * | 12/1938 | Frees ....................... | B60N 2/39 |
| | | | | | 297/314 X |
| 2,409,714 | A | * | 10/1946 | Silhan .................... | B60N 2/502 |
| | | | | | 297/314 X |
| 2,489,981 | A | * | 11/1949 | Rose ........................ | B60N 2/38 |
| | | | | | 297/314 X |
| 2,534,386 | A | * | 12/1950 | Stewart ................... | B60N 2/38 |
| | | | | | 297/314 X |

(Continued)

FOREIGN PATENT DOCUMENTS

| | | |
|---|---|---|
| DE | 41 15 639 A1 | 11/1992 |
| DE | 102 39 362 A1 | 3/2004 |
| WO | WO 2014/176130 A1 | 10/2014 |

OTHER PUBLICATIONS

Search Report prepared by the German Patent Office on Apr. 19, 2016, for German Patent Application No. 10 2015 118 442.7.

*Primary Examiner* — Rodney B White
(74) *Attorney, Agent, or Firm* — Sheridan Ross P.C.

(57) ABSTRACT

Vehicle seat which is arranged on a vehicle body, is movable relative to the vehicle body and comprises at least one spring apparatus and/or at least one damping apparatus for displacing and for absorbing oscillations in the vertical and/or horizontal direction, and at least one seat stabilization apparatus arranged on the vehicle seat for stabilizing the vehicle seat in the vertical and/or horizontal direction, wherein the seat stabilization apparatus comprises at least one rotary element which is mounted so as to rotate about a first rotational axis, can rotate at a rotational frequency and by means of which a torque can be generated by a force acting from outside on the vehicle seat and on the rotational pulse generated by the rotary element, which torque counteracts a rotational movement of the vehicle seat and/or the vehicle body generated by the force about an actual and/or imaginary second rotational axis.

19 Claims, 11 Drawing Sheets

(56) References Cited

U.S. PATENT DOCUMENTS

| | | | | |
|---|---|---|---|---|
| 2,569,730 A | * | 10/1951 | O'Donnell | B60N 2/38 297/314 X |
| 2,707,986 A | * | 5/1955 | Johnson | B60N 2/39 297/314 X |
| 2,715,938 A | * | 8/1955 | Miller | B60N 2/39 297/314 X |
| 2,932,341 A | * | 4/1960 | Morrison | B60N 2/502 297/314 X |
| 2,949,153 A | * | 8/1960 | Hickman | B60N 2/502 297/314 X |
| 3,191,400 A | * | 6/1965 | Swenson | B60N 2/14 297/314 X |
| 3,531,153 A | * | 9/1970 | Mohs | B60N 2/02 297/314 X |
| 3,670,834 A | * | 6/1972 | Rogers | B62D 49/08 297/314 X |
| 4,057,213 A | * | 11/1977 | Kokkila | A47C 9/02 297/314 X |
| 4,834,452 A | * | 5/1989 | Goodrich | B60N 2/062 297/314 X |
| 5,901,612 A | * | 5/1999 | Letovsky | A47C 1/12 297/314 X |
| 5,992,933 A | * | 11/1999 | West | B60N 2/39 297/313 |
| 6,056,362 A | * | 5/2000 | de la Haye | A47C 3/02 297/314 X |
| 6,068,280 A | * | 5/2000 | Torres | A61G 5/045 297/314 X |
| 6,206,335 B1 | * | 3/2001 | Huber | A47C 21/006 297/313 X |
| 8,562,060 B2 | * | 10/2013 | Kato | B60N 2/01583 297/314 X |
| 8,985,600 B2 | * | 3/2015 | Nyitray | A61G 5/10 297/314 X |
| 2009/0218867 A1 | * | 9/2009 | Clark | B60N 2/501 297/344.12 |
| 2011/0233364 A1 | * | 9/2011 | Breen | B60N 2/501 248/421 |
| 2011/0233975 A1 | * | 9/2011 | Mindel | B60N 2/24 297/216.17 |
| 2014/0263911 A1 | * | 9/2014 | Parker | F16M 13/02 248/327 |
| 2014/0263932 A1 | * | 9/2014 | Schroeder | F16F 7/1022 248/610 |
| 2015/0266448 A1 | * | 9/2015 | Aoki | B60R 22/20 297/313 |
| 2015/0343924 A1 | * | 12/2015 | Takeuchi | B60N 2/39 297/314 |
| 2016/0374879 A1 | * | 12/2016 | Christian | A61G 5/14 297/313 |

* cited by examiner

DEVICE FOR SEAT STABILIZATION

CROSS-REFERENCE TO RELATED APPLICATIONS

This application claims the benefit of German Patent Application No. DE 10 2015 118 442.7 filed Oct. 28, 2015, the entire disclosure of which is incorporated herein by reference.

FIELD

The invention relates to a vehicle seat, in particular for commercial vehicles, which is arranged on a vehicle body, is movable relative to the vehicle body and comprises at least one spring apparatus and/or at least one damping apparatus for displacing and for absorbing oscillations in the vertical and/or horizontal direction, and at least one seat stabilization apparatus arranged on the vehicle seat for stabilizing the vehicle seat in the vertical and/or horizontal direction.

BACKGROUND

The prior art discloses vehicle seats of this type which provide damping and/or suspension of the vehicle seat relative to a vehicle body by means of a pneumatic spring apparatus. If the vehicle seat deflects, the volume of the pneumatic spring changes, it being possible to compensate for this difference in volume by means of a control apparatus and preferably an air cell or another air supply.

These variant of the seat stabilization by supplying and removing air from a pneumatic spring are, however, relatively ineffective, since first deflection has to be detected and, on the basis of this, a volume to be changed has to be determined and then, on the basis of this, this difference in volume is compensated for by means of a control apparatus.

SUMMARY

The problem addressed by the present invention is therefore to provide a particularly simple seat stabilization apparatus which can almost directly react to a deflection of the vehicle seat and counteract this deflection.

This problem is solved according to the features of claim 1. Advantageous embodiments of the invention are found in the dependent claims.

The central concept of the invention is to provide a vehicle seat which is arranged on a vehicle body, is movable relative to the vehicle body and comprises at least one spring apparatus and/or at least one damping apparatus for displacing and for absorbing oscillations in the vertical and/or horizontal direction, and at least one seat stabilization apparatus arranged on the vehicle seat for stabilizing the vehicle seat in the vertical and/or horizontal direction, wherein the seat stabilization apparatus comprises at least one rotary element which is mounted so as to rotate about a first rotational axis, can rotate at a rotational frequency and by means of which a torque can be generated by a force acting from outside on the vehicle seat and on the rotational pulse generated by the rotary element, which torque counteracts a rotational movement of the vehicle seat and/or the vehicle body generated by the force about an actual and/or imaginary second rotational axis.

It is advantageous here for the rotary element to be rotationally symmetrical so that during rotation about the first rotational axis, undesired side effects such as uneven running of the rotary element can be prevented.

Because the rotary element is rotatable, a rotational pulse, more specifically a rotational pulse vector, is generated.

If the vehicle travels over a lower or raised area of terrain, referred to in the following as uneven terrain, for example on a field, the vehicle body and accordingly also the vehicle seat are deflected from their previous position in space. Owing to this deflection, a force is transmitted to the vehicle body and/or the vehicle seat which then also acts on the rotary element and as a result on the rotational pulse, more specifically the rotational pulse vector, due to the arrangement of the seat stabilization apparatus on the vehicle seat.

Since the vehicle first contacts the uneven terrain with a first axle and then contacts said terrain with a second axle or additional axles, a rotational movement is generated on the vehicle body and/or the vehicle seat by the force applied.

According to a particularly preferred embodiment, the vehicle seat is arranged on a first suspension element which is rotatably mounted relative to a second suspension element by means of the second rotational axis. Preferably, the second suspension element is connected to the vehicle body. More preferably, the second rotational axis is arranged so as to extend in the width direction of the vehicle seat. Particularly preferably, the second rotational axis is arranged in a front region of the first suspension element.

If a forces acts in particular on the vehicle seat, the first suspension element and thus also the vehicle seat are caused to rotate relative to the second suspension element about the second rotational axis due to the force applied.

Owing to the force applied to the seat stabilization apparatus and in particular to the rotational pulse vector, a torque is generated by changing the position of the rotational pulse vector in order to maintain the position of the rotational pulse vector in space. The torque generated therefore counteracts the rotational movement of the vehicle seat.

This embodiment is particularly advantageous to that effect, since the rotational movement generated by the force applied can be counteracted particularly effectively.

According to another preferred embodiment, the spring apparatus and/or the damping apparatus are connected both to the first suspension element and to the second suspension element, i.e. the spring apparatus and/or the damping apparatus are preferably arranged between the first suspension element and the second suspension element. This therefore means that the first suspension element is only connected to the vehicle body by means of the second suspension element.

According to a particularly preferred embodiment, it is provided that the rotational frequency of the rotary element can be adjusted. Owing to a change in the rotational frequency, the magnitude of the rotational pulse can be influenced, i.e. by changing the rotational frequency, the vehicle seat can be adapted to the requirements of the terrain over which the vehicle is travelling, and to the driver's comfort levels. Another option for changing the magnitude of the rotational pulse is of course also changing the moment of inertia of the rotary element.

Here, the rotational frequency can be changed and adjusted preferably by means of a motor, in particular an electric motor, which is operatively connected to the first rotational axis. It should be noted here that a rotational speed of zero is also possible, i.e. the rotary element is not rotating. In this state, however, the magnitude of the rotational pulse is also zero, and therefore torque cannot be generated in this state in order to counteract the force applied.

According to a first preferred embodiment, the first rotational axis has a fixed position relative to the vehicle seat. This therefore means that the rotational axis is always in the same position relative to the vehicle seat, and therefore in particular is not arranged so as to rotate relative to the vehicle seat.

Owing to this fixed position of the first rotational axis relative to the vehicle seat, the torque generated by the rotary element can therefore counteract the rotational movement of the vehicle seat particularly effectively.

If, according to an embodiment, a first and a second suspension element are provided, it is thus particularly advantageous for the first rotational axis and the second rotational axis to be oriented perpendicularly to one another and to intersect at a point. As a result, during a rotational movement of the vehicle seat about the second rotational axis, the moments of inertia can be minimised. Here too, this is preferably a first rotational axis having a fixed position relative to the vehicle seat.

According to a second preferred embodiment, the rotary element is arranged in the seat stabilization apparatus by means of a cardanic suspension. By a cardanic suspension, a suspension is to be understood such that the rotary element has at least one degree of freedom, i.e. movement is permitted in at least one spatial direction.

Advantageously, the cardanic suspension is selected such that the rotary element can move in the three spatial directions.

If, according to this embodiment, a torque is generated by a force applied, the rotary element moves accordingly in the cardanic suspension in order to maintain the position of the rotational pulse vector in space. Here, however, the torque is not directly transmitted to the vehicle seat.

According to an embodiment, it is therefore provided that the movement of the rotary element can be detected in the cardanic suspension due to the torque generated. It is possible to detect the movement or the current position of the rotary element using one or more angle transmitters or angular position transmitters, which translate or convert each measured angle into a corresponding electrical signal.

The detected movement and/or position of the rotary element can therefore be advantageously transmitted as an electrical signal to at least one actuator, by means of which the rotational movement of the vehicle seat can be counteracted.

The actuator may be electrical, hydraulic or pneumatic. Preferably, a plurality of actuators are provided, each actuator being arranged to act in one of the three spatial directions.

According to a particularly advantageous embodiment, the first rotational axis and the second rotational axis are oriented perpendicularly or in parallel with one another, such that the torque generated by the rotary element can be transmitted to the vehicle seat particularly effectively. In particular, this design prevents movements that would lead to tilting.

It is also advantageous for it to be possible for the seat stabilization apparatus to be temporarily arranged on the vehicle seat, as a result of which it possible to replace or repair defective seat stabilization apparatuses.

If the first rotational axis is designed such that it assumes a fixed position relative to the vehicle seat, the rotary element can only generate a torque in one spatial direction. If it is desired to generate a torque in a plurality of spatial directions, since for example just one wheel contacts uneven terrain, which is equivalent to a rotation of the vehicle body and/or the vehicle seat in more than one spatial direction, a plurality of rotary elements are required, of which the rotational axes are oriented perpendicularly to the first rotational axis.

In order to reduce the power consumption of the seat stabilization apparatus, it is advantageous for a housing which can be evacuated to be arranged around the rotary element. Owing to the resulting vacuum within the housing, the rotary element can operate with reduced friction, and this corresponds to a lower supply of power to the rotary element.

Advantageous embodiments emerge from the dependent claims.

BRIEF DESCRIPTION OF THE DRAWINGS

Advantages and expediencies can be found in the following description in conjunction with the drawings, in which.

DETAILED DESCRIPTION

Figure 1:
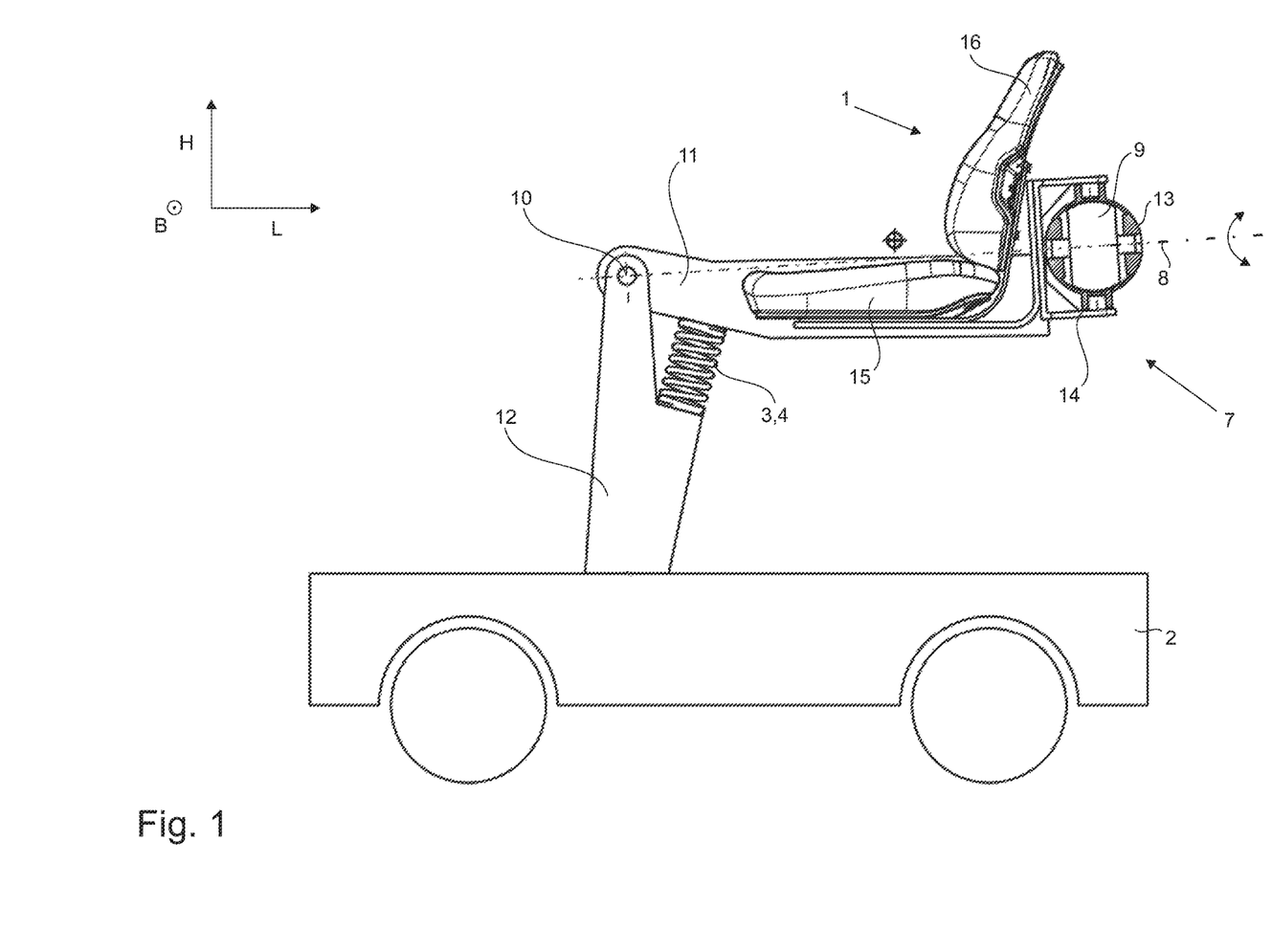
FIG. 1 shows a vehicle seat comprising a seat stabilization apparatus for stabilization in the vertical direction according to a preferred embodiment.

FIG. 1 shows a particularly advantageous embodiment of the present invention. The vehicle seat 1, comprising a seat part 15 and a backrest part 16, in this case comprises a seat stabilization apparatus 7, the seat stabilization apparatus 7 comprising a housing in which a rotary element 9 is arranged that is mounted so as to rotate about a first rotational axis 8. As can be seen, the housing 13 is surrounded at least in part by a holder 14, by means of which the seat stabilization apparatus 7 can be mounted on the vehicle seat 1. Preferably, this is a detachable connection, so that the seat stabilization apparatus 7 can also be removed again in order to mount a different seat stabilization apparatus 7 or to repair the removed seat stabilization apparatus 7, for example.

Furthermore, the vehicle seat 1 is arranged on a first suspension element 11 which is connected to a second suspension element 12 by a second rotational axis 10, the second suspension element 12 preferably being rigidly connected to the vehicle body 2. As can also be seen, the spring apparatus 3 and the damping apparatus 4 (each only shown schematically here) are arranged between the first suspension element 11 and the second suspension element 12.

The rotational frequency of the rotary element 9 is preferably adjustable here, i.e. can be adjusted by a person sitting on the vehicle seat 1. Alternatively, or additionally, it is also conceivable for the rotational frequency to be adapted automatically to the mass of the person, for example by the mass of the person being determined and the rotational frequency being adjusted by means of an adjustment device (not shown here).

In this case, the rotational frequency can be set to almost any value, it also being possible to set a rotational frequency of zero. This means that the rotary element 9 does not rotate about the first rotational axis 8, i.e. it is stationary. This is advantageous in particular if no one is sitting on the vehicle seat 1, and therefore the seat 1 does not need to be stabilized. Particularly advantageously, the adjustment device can determine whether or not a person is sitting on the vehicle seat 1, for example using pressure sensors or other sensors. If no one is sitting on the vehicle seat 1, the rotational frequency is preferably set to zero automatically. If, however, it is registered that a person is sitting on the vehicle seat 1, the rotary element 9 is operated at a predefinable rotational frequency. It is clear here that the rotary element 9 first has to go through an acceleration phase.

It is noted here that the rotational direction of the rotary element 9 is unimportant in this case, since only the position of the first rotational axis 8 and the direction of the force 17 applied, and not the orientation of the rotational pulse vector, is relevant to the ultimate counteraction of the force. The physical mode of operation of the present invention is set out in greater detail in the following.

Figure 2:
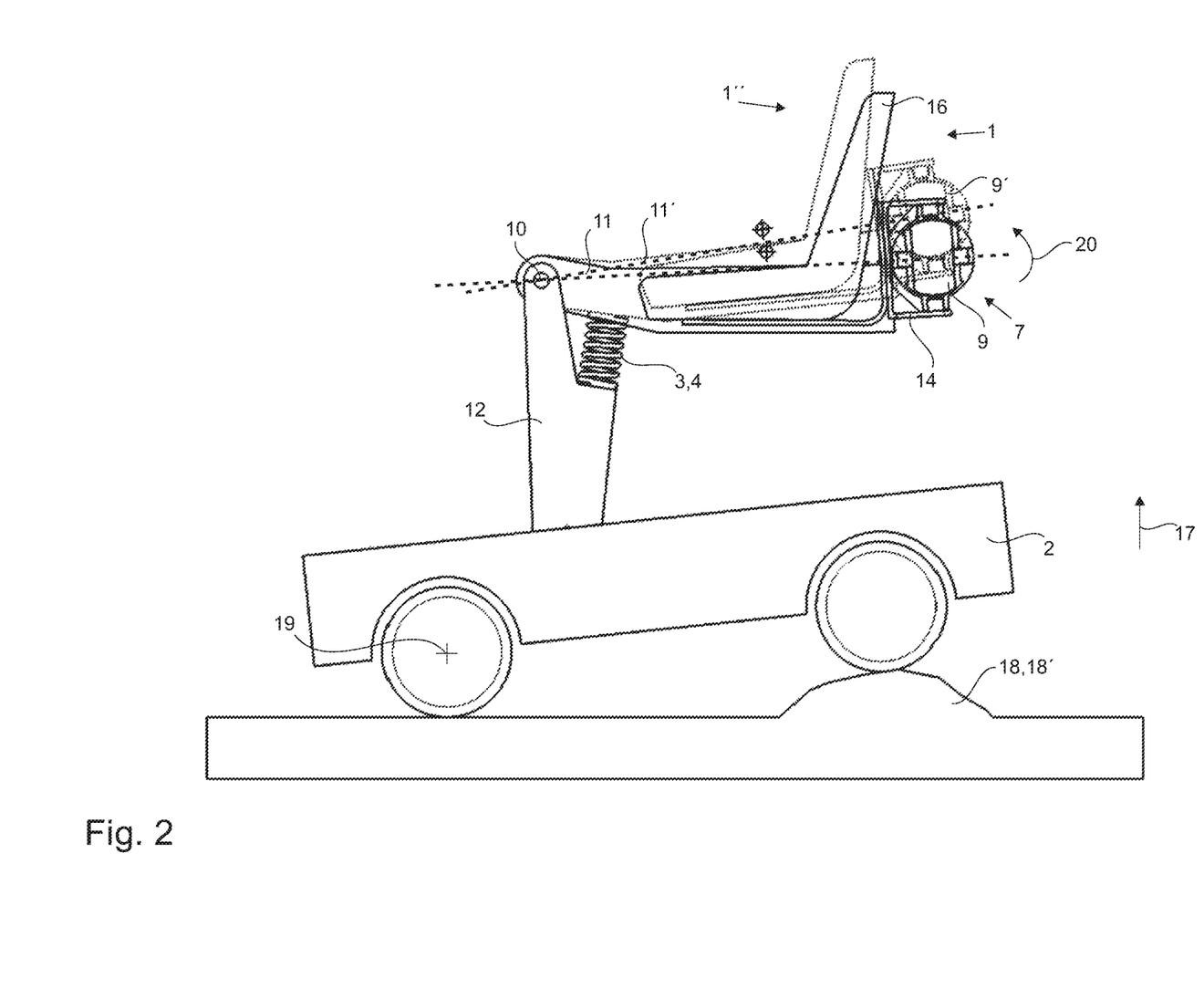
FIG. 2 shows a vehicle seat according to FIG. 1 when travelling over uneven terrain.

FIG. 2 shows how the vehicle seat 1 and the vehicle body 2 behave when travelling over uneven terrain 18, in this case a raised area of ground.

By travelling over the uneven terrain 18, a force 17 is applied to the body 2 and accordingly also to the vehicle seat 1, as a result of which the vehicle seat 1 undergoes rotation about the second rotational axis 10 and the vehicle body 2 undergoes a rotational movement about a third rotational axis 19 due to the arrangement on a first suspension element 11 and a second suspension element 12 that has already been described in FIG. 1. Here, the rotational movement of the vehicle body 2 about the third rotational axis 19 of course causes the rotational movement 20 of the vehicle seat 1 about the second rotational axis 10. In this case, the deflected vehicle seat 1' is shown by dotted lines. The vehicle seat 1 shown by solid lines corresponds to the original position of the vehicle seat 1, i.e. before travelling over the uneven terrain 18. Other reference signs having an apostrophe also relate to the deflected situation.

It should be noted here that, if the seat 1 were not mounted relative to the body 2 as it is in the present case, but for example were connected to the body by means of a scissor-action frame or other attachment devices, the second rotational axis 10, about which the rotational movement of the vehicle seat 1 is generated, would correspond to the third rotational axis 19.

It should also be noted here that the rotational movement 20 of the vehicle seat 1 is delayed compared with the rotational movement of the vehicle body, due to inertial effects. It is also clear that the rotational movement 20 of the vehicle seat 1 still continues due to the mass of the vehicle seat 1 being lower while the force applied remains the same.

FIG. 3A to 3D show and explain an example of the mode of operation of the present invention in greater detail.

The first rotational axis 8 of the rotary element 9 is arranged perpendicularly to the second rotational axis 10 in this case, the first rotational axis 8 and the second rotational axis 10 intersecting at a point. Here, the dashed line represents the rotational axis 8, a rotational pulse vector 21 also being shown. In this case, the position of the rotational axis 8 corresponds to the position of the rotational pulse vector 10, and therefore there is no need for a distinction to be made in the following figures.

Figure 3A:
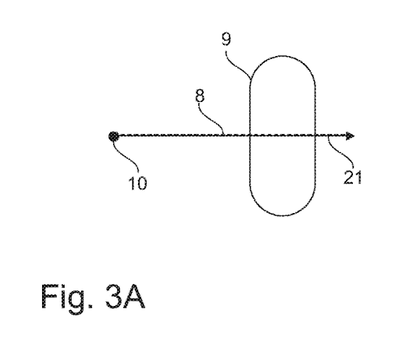
FIG. 3A-3D show the mode of operation of the seat stabilization apparatus.

FIG. 3A shows a situation in which force is not yet being applied to the vehicle seat 1. Accordingly, the position of the rotary element 9 does not change.

Figure 3B:
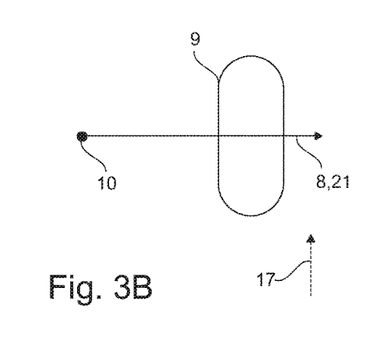

FIG. 3B shows the situation at the start of an application of force 17, for example due to travelling over uneven terrain 18 (not shown here). Owing to inertial effects, the position of the rotary element 9 has not yet changed, or has only changed slightly, at the start of the application of force 17.

Figure 3C:
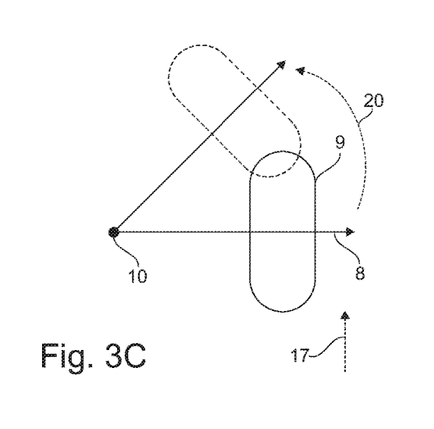

FIG. 3C shows how the vehicle seat 1 and in particular the rotary element 9 would move if the rotary element 9 rotates at a rotational frequency of zero, i.e. is stationary. A rotational movement 20 about the second rotational axis 10 is brought about by the force 17, as shown by the dashed lines in FIG. 3C.

Since, however, in the event of stabilization the rotary element 9 rotates about the first rotational axis 8 at a rotational frequency of greater than zero, a rotational pulse vector 21 is generated. In the present case, the position of the first rotational axis 8 is simultaneously also the position of the rotational pulse vector 21.

As is known, the rotational pulse of a system describes a conservation value, as can be demonstrated by Noether's theorem. This means that a system attempts to conserve the position, the orientation and the magnitude of the conservation value.

Figure 3D:
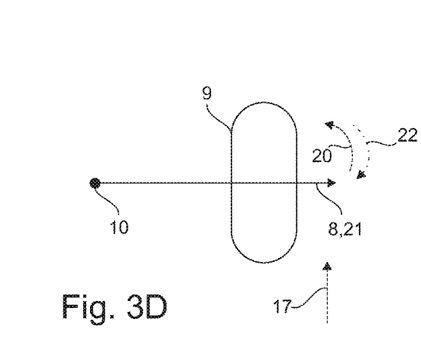

In order to also conserve the conservation value when a force is applied that acts on the system from outside, a torque is generated by the system that counteracts the force 17 applied. In the present case, a rotational movement 22 of the rotary element 9, and as a result in particular of the vehicle seat 1, is generated by the torque generated and counteracts the rotational movement 20 brought about by the force 17 applied. This can be seen in FIG. 3D. In this case, the magnitude of the torque is determined by the magnitude of the force 17 applied. FIG. 3D shows the case in which the rotational movement 22 brought about by the torque compensates for the rotational movement 20 brought about by the force 17 applied. However, it is also conceivable, of course depending on the strength of the force 17 applied, for the rotational pulse vector 21 and accordingly the rotary element 9 still to change their position in space, since for example the force applied is too high to be compensated for by the resulting torque.

It is thus clear here that, depending on the magnitude of the force 17 applied, a rotational movement 20 about the second rotational axis 10 can still be determined, since the torque cannot completely compensate for the rotational movement 20, particularly if there are strong forces 17 and due to inertial effects. Nevertheless, the result in this case is noticeable seat stabilization, without using a complex construction. In the present case, only a mechanical device for seat stabilization is proposed.

Figure 4A:
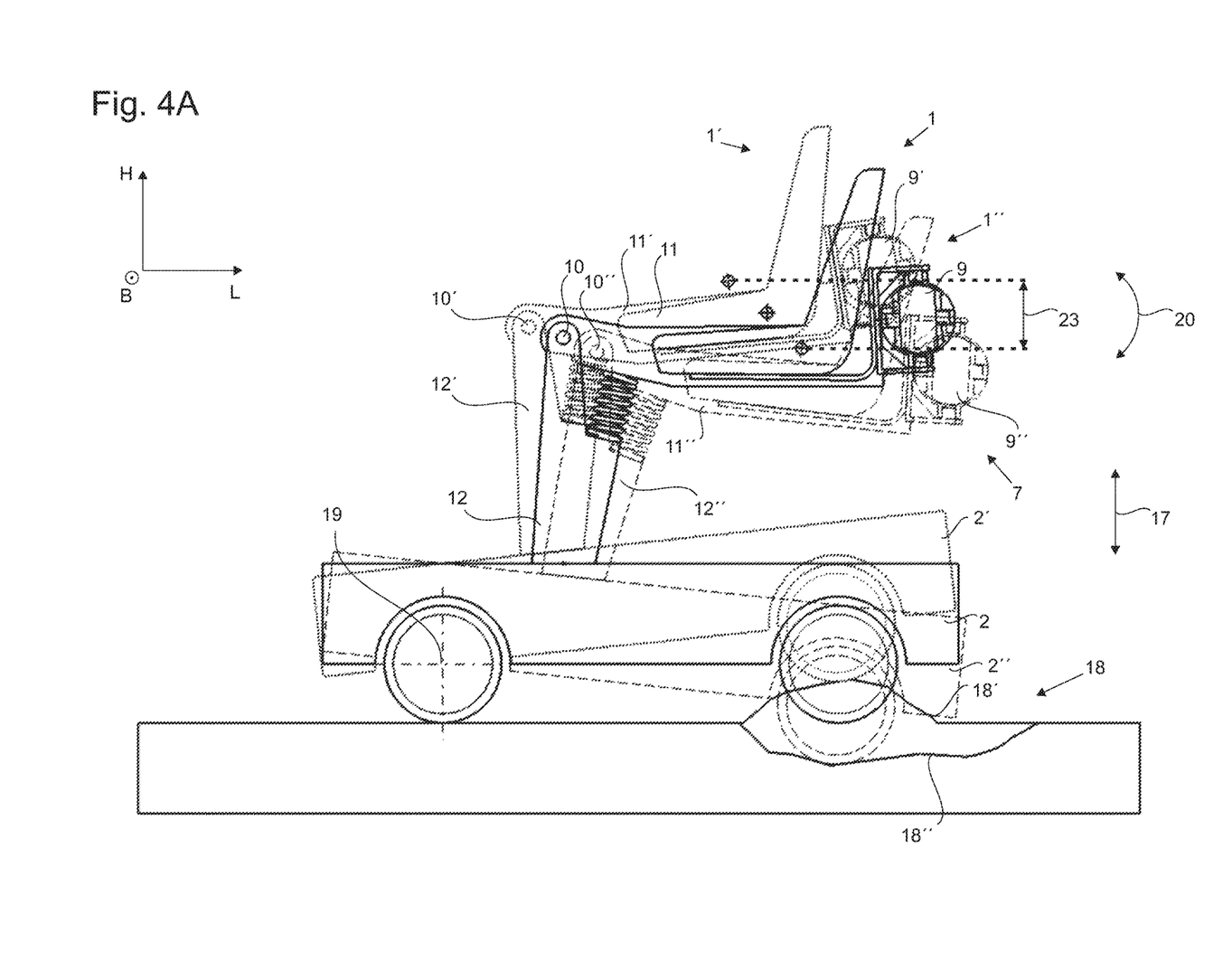
FIG. 4A shows the deflection of the vehicle seat according to FIG. 1 when the seat stabilization is deactivated.
Figure 4B:
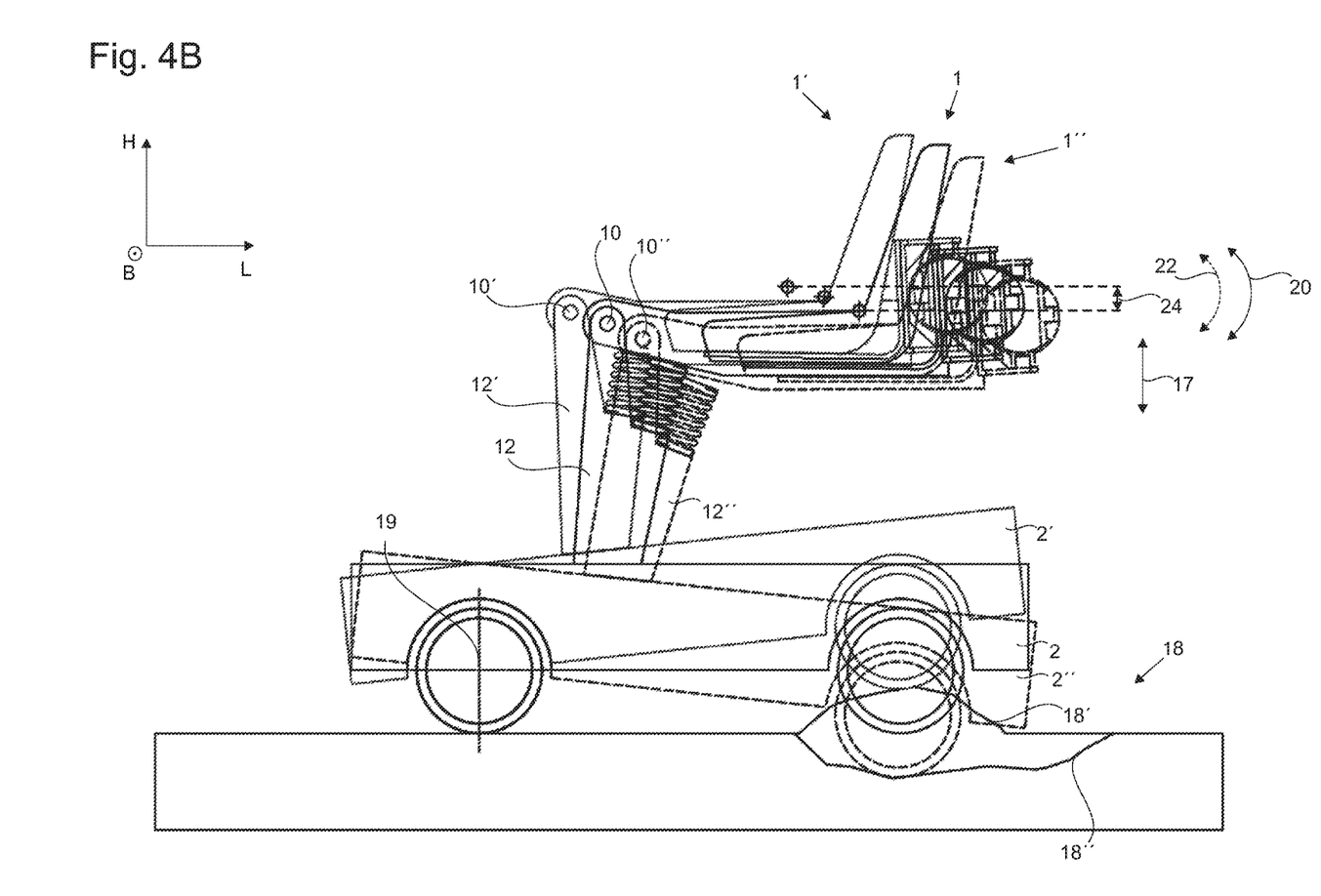
FIG. 4B shows the deflection of the vehicle seat according to FIG. 1 when the seat stabilization is activated.

When FIGS. 4A and 4B are compared, the effect of the seat stabilization apparatus 7 can be clearly seen. FIGS. 4A and 4B each show the vehicle seat 1 not having deflected, shown by solid lines, the vehicle seat 1' when travelling over a raised area of terrain, shown by dotted lines, and the vehicle seat 1" when travelling over a lower area of terrain, shown by dashed lines. If the seat stabilization apparatus 7 is not in operation, as shown in FIG. 4A, a large deflection 23 can be seen, with deflection being understood to mean the height difference of the vehicle seat 1 between the situation when travelling over raised area of terrain and the situation when travelling over a lower area of terrain.

If the rotational movement 20 of the vehicle body 2 takes place due to the application of a force 17, the position of the vehicle body 2, and in particular the position of the vehicle seat 1 connected to the vehicle body 2 by means of the suspension elements 11, 12, changes accordingly.

Since in the present case the second suspension element 12 is rigidly connected to the vehicle body 2, the suspension element 12 and accordingly the second rotational axis 10 are pivoted into a position further forwards in the longitudinal direction L and further upwards in the vertical direction H compared with the original position of the vehicle seat 1 when travelling over a raised area of terrain 18', shown by the second pivot axis 10', and are pivoted further backwards in the longitudinal direction L and further downwards in the vertical direction H when travelling over a lower area of terrain 18", shown by the pivot axis 10".

In general, the reference signs used in FIGS. 1 to 3 are used for the original system, the reference signs having one apostrophe are used for the system when travelling over a raised area of terrain 18' and the reference signs having two apostrophes are used for the system when travelling over a lower area of terrain 18".

As can be seen from comparing FIGS. 4A and 4B, the deflection 24 of FIG. 4B, in which the seat stabilization apparatus 7 is in operation, is significantly less than the deflection 23 in FIG. 4A. As can also be clearly seen from comparing FIGS. 4A and 4B, the pivoting of the vehicle body 2 and the second suspension element 12, 12', 12" according to FIG. 4B is the same as in FIG. 4A. In this case, the pivoting of the first suspension element 11, 11', 11" and the vehicle seat 1, 1', 1" is significantly lower owing to the active seat stabilization 7, which counteracts the rotational movement 20 due to the force 17 applied by means of the rotational movement 22 generated by the torque generated.

Figure 5A:
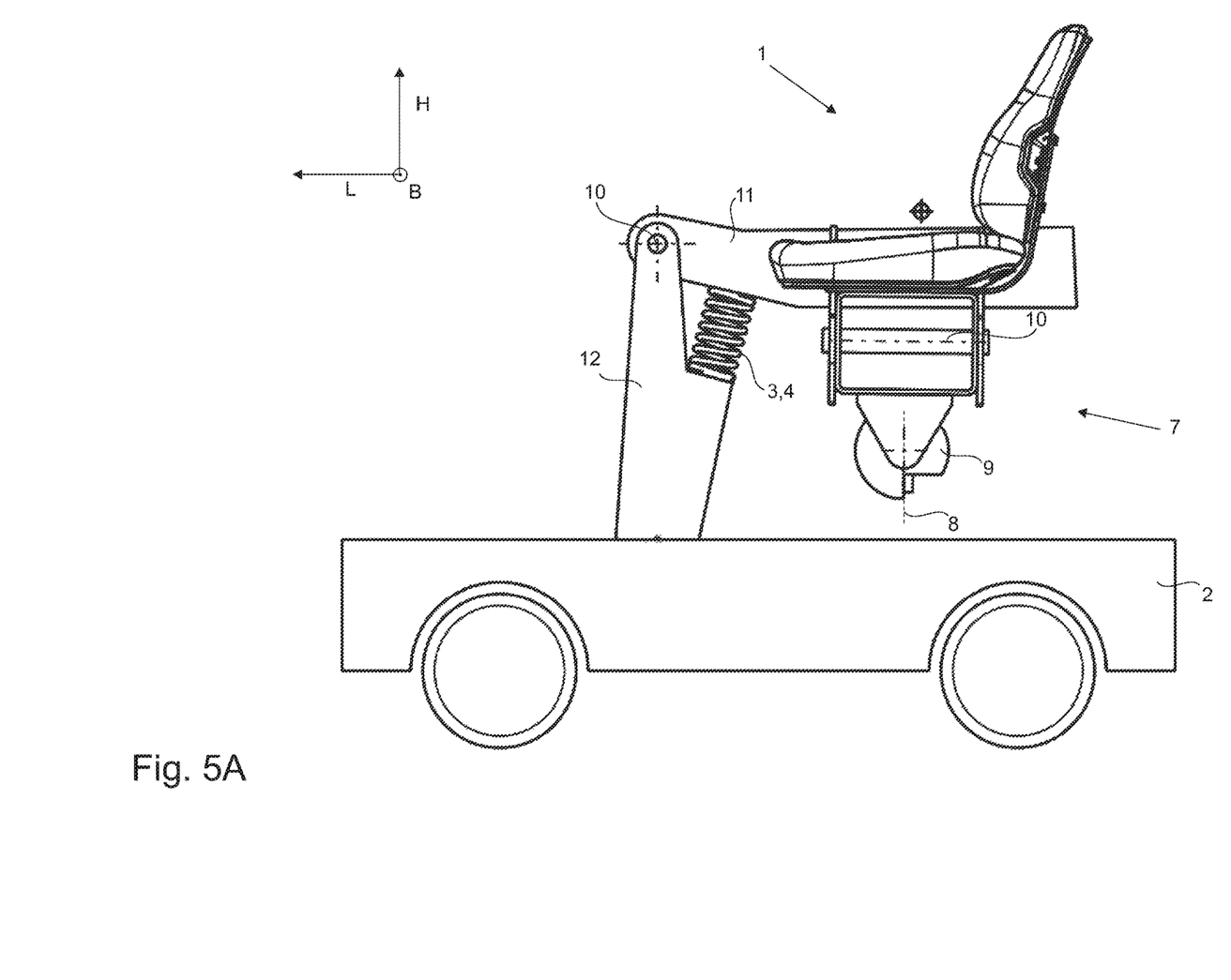
FIG. 5A shows a vehicle seat comprising a seat stabilization apparatus for stabilization in the horizontal direction according to a preferred embodiment.
Figure 5B:
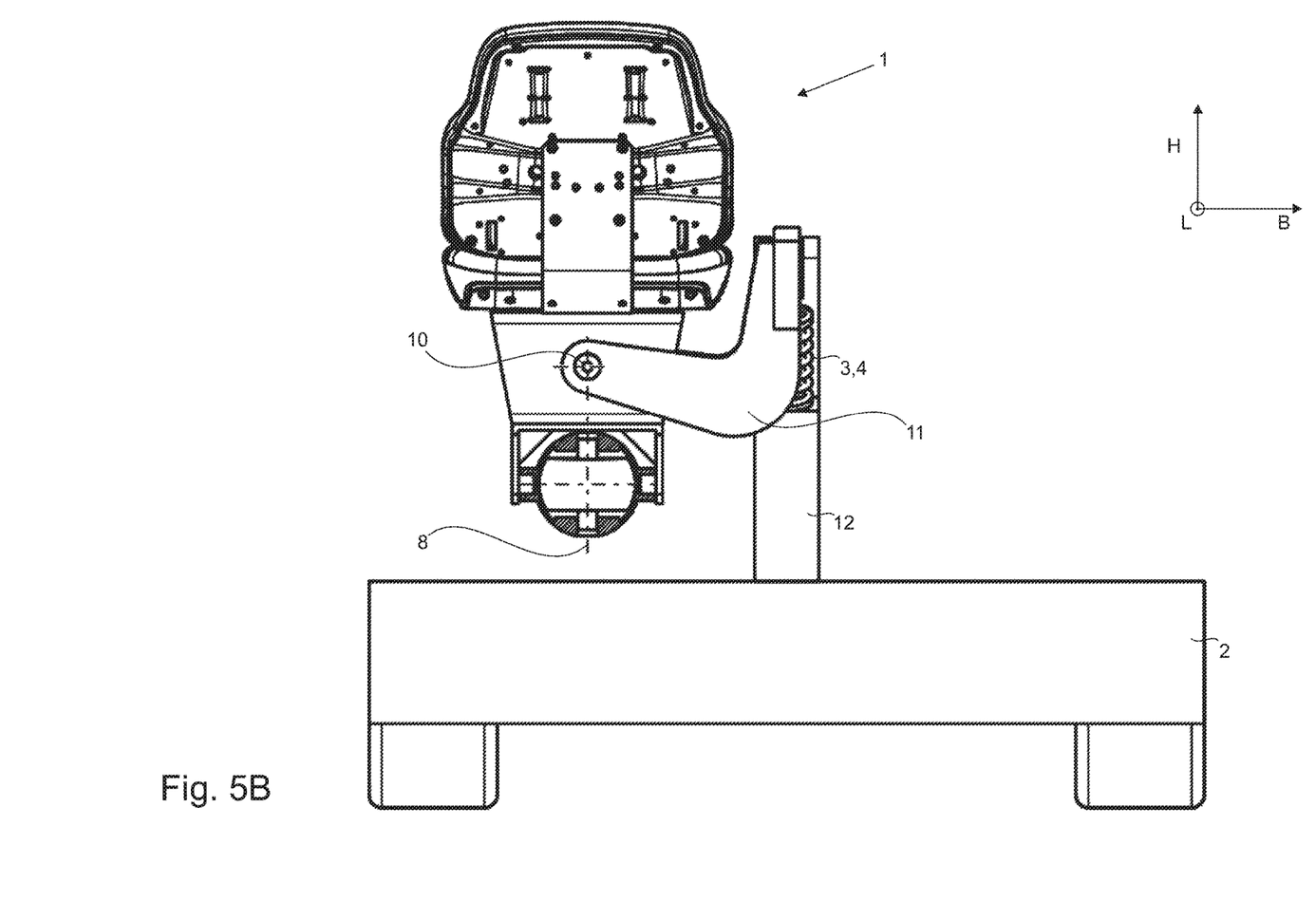
FIG. 5B is a rear view of a vehicle seat according to FIG. 5A.

FIGS. 5A and 5B show an arrangement of a seat stabilization apparatus 7 for seat stabilization in the horizontal direction. Here, the seat-stabilization device 7 is attached below the vehicle seat 1, the vehicle seat 1 being mounted so as to rotate about a second rotational axis 10 in the horizontal direction.

The first rotational axis 8 of the rotary element 9 is oriented in the vertical direction H here.

As can be seen in particular from FIG. 5B, the vehicle seat 1 is mounted so as to rotate relative to the first suspension element 11 by means of the second rotational axis 10. In the present case, the second rotational axis 10 extends in the longitudinal direction L.

Figure 6A:
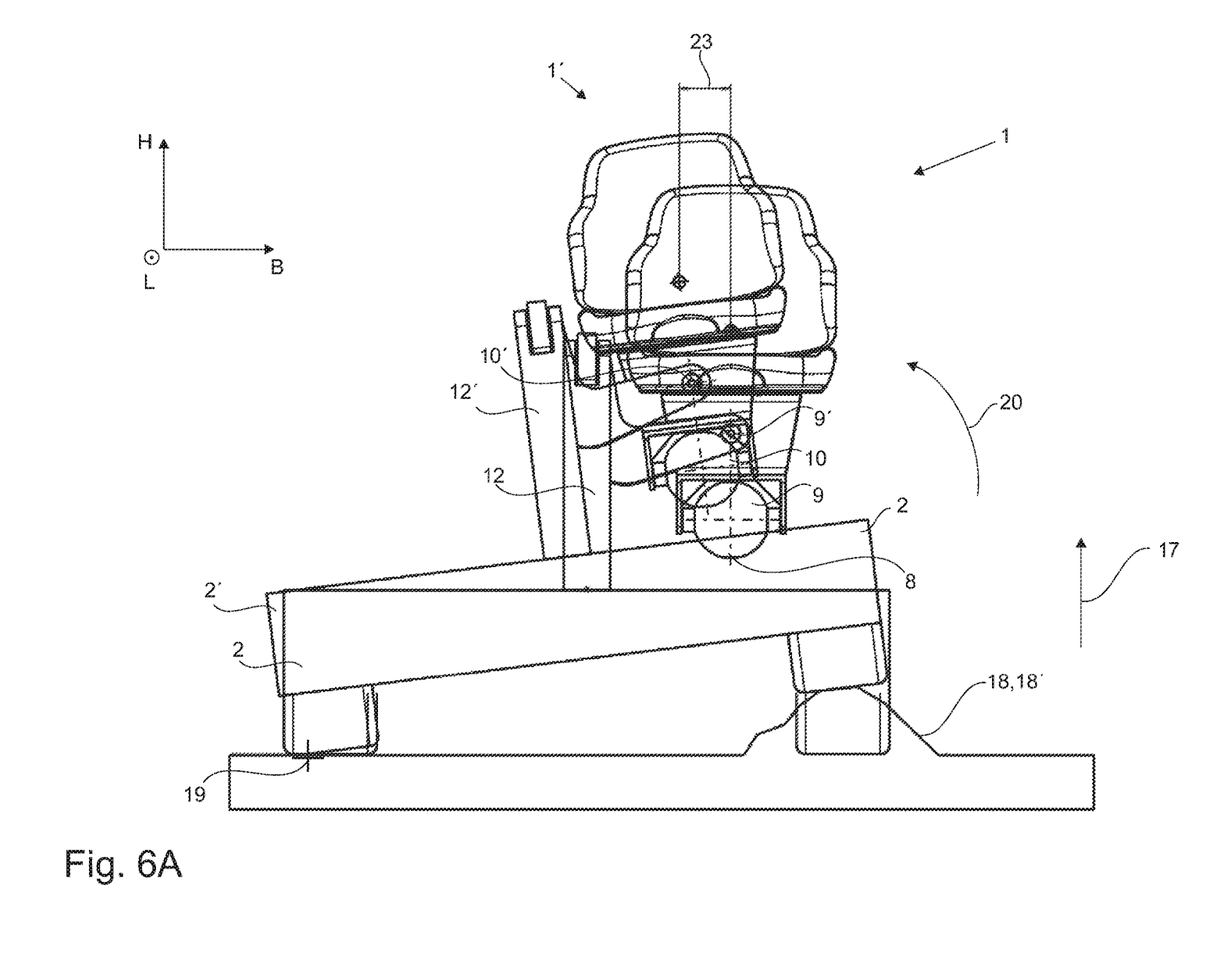
FIG. 6A shows the deflection of the vehicle seat according to FIG. 5B when the seat stabilization is deactivated.
Figure 6B:
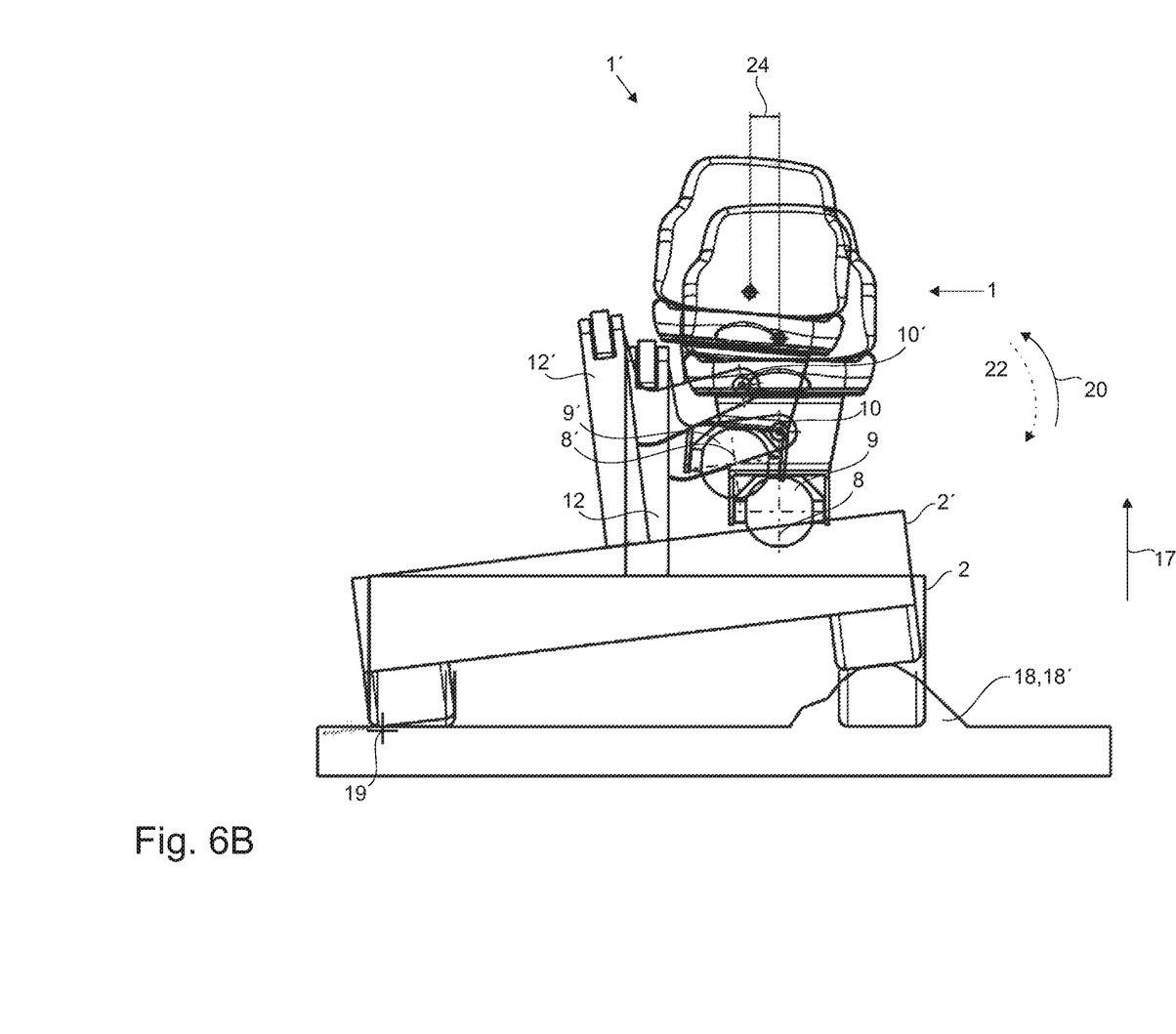
FIG. 6B shows the deflection of the vehicle seat according to FIG. 1 when the seat stabilization is activated.

The mode of operation of the seat stabilization apparatus 7 shown in FIGS. 5A and 5B is shown by way of example on the basis of FIGS. 6A and 6B.

Here, FIG. 6A shows the situation in which the seat stabilization is deactivated, i.e. having a rotary element 9 that has a rotational frequency of zero, and FIG. 6B shows the situation in which the seat stabilization is activated, i.e. the rotary element 9 has a rotational frequency of greater than zero.

In this case, the vehicle, and in particular the vehicle body 2, travels over uneven terrain 18, in the present case a raised area of terrain 18', as a result of which both the body 2 and the vehicle seat 1 undergo a rotational movement 20 about the third rotational axis 19 due to a force 17 being applied, the rotational axis extending in the longitudinal direction of the vehicle seat in the present case.

In this case, in addition to the vehicle body 2, the first suspension element 11, the second suspension element 12, which is rigidly connected to the vehicle body 2 here, and the vehicle seat 1 pivot about the third pivot axis 19. The pivoted positions are again represented by reference signs having one apostrophe.

If the seat stabilization apparatus 7 is in operation, i.e. the rotary element 8 is rotating at a rotational frequency greater than zero, this rotational movement 20 is counteracted by means of a torque generated and the rotational movement 22 generated thereby. The principle is the same here as that described above. In particular, the vehicle seat 1 undergoes this rotational movement 22 in this case, since the vehicle body 2 comprising the second suspension element 12 that is rigidly connected to the vehicle body can only undergo a rotational movement 20.

The activated seat stabilization apparatus 7 can therefore both reduce the deflection 24 compared with the deflection 23 when the seat stabilization apparatus 7 is deactivated, and can stabilize the orientation of the vehicle seat, so that, as shown in FIG. 6B, the vehicle seat 1, 1' is oriented further substantially in the width direction B of the seat, i.e. either in the width direction B of the seat or at a small angle thereto, for example an angle of from 0° to 25°.

Here too, it is clear from comparing FIGS. 6A and 6B that, owing to the seat stabilization apparatus 7 being activated, the deflection 24 is considerably less compared with the deflection 23 when the seat stabilization apparatus 7 is deactivated.

Likewise, in each embodiment the position of the seat part 2 in particular is stabilized by the seat stabilization apparatus 7.

It is therefore advantageous to provide at least two seat stabilization apparatuses 7, in order to allow seat stabilization in all the spatial directions L, H and B.

Figure 7A:
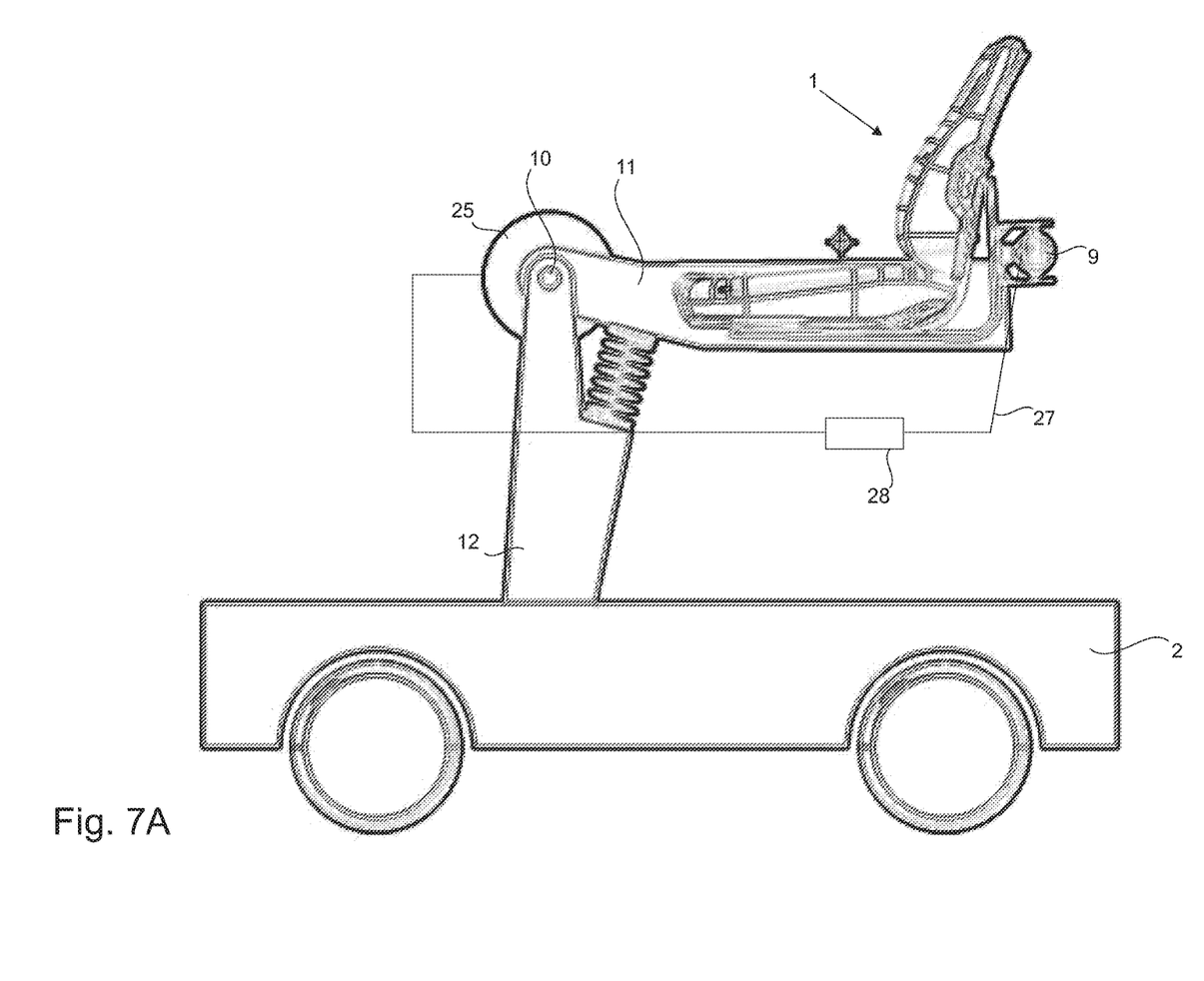
FIG. 7A shows a vehicle seat comprising a seat stabilization apparatus for stabilization in the vertical direction according to another preferred embodiment.

According to FIG. 7A, an alternative embodiment of the present invention is shown. In this figure, the vehicle seat 1 has a seat stabilization apparatus 7 comprising a rotary element 9 and at least one actuator 25.

Figure 7B:
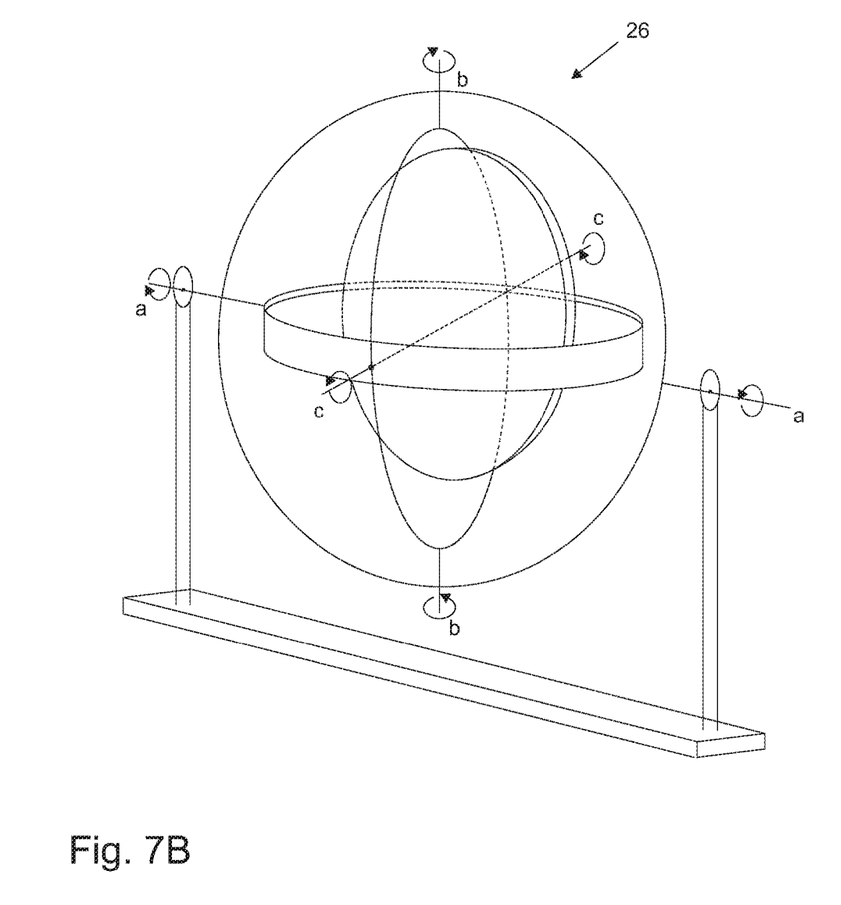
FIG. 7B is a schematic view of a cardanic suspension.

In this case, the rotary element 9 is preferably not designed to have a first rotational axis that is stationary relative to the vehicle seat 1, but rather mounted by means of a cardanic suspension 26. A cardanic suspension 26, shown by way of example in FIG. 7B, allows the rotary element 9 to move in the three spatial directions L, H and B. In addition, the suspension 26 has pivot axes a, b, c, which are each perpendicular to one another. Advantageously, one or more angle transmitters or angular position transmitters are arranged on each of the pivot axes a, b, c and translate or convert each measured angle into a corresponding electrical signal in the event of pivoting about a pivot axis a, b, c. A cardanic suspension 26 of this type that allows the rotary element 9 to move in each spatial direction L, H, B is of course particularly advantageous. Since, however, transmission lines, for example electrical lines, and corresponding angle transmitters or switch elements (not shown here) that can also pivot during the pivoting are required for each pivot axis a, b, c, it is advantageous to provide cardanic suspensions that each only have one degree of freedom, i.e. only allow movement in one spatial direction L, H, B, meaning that a construction that is as simple as possible is permitted.

For example, a cardanic suspension can be provided that allows the position of the rotary element 9 to change in the spatial direction L, i.e. in the longitudinal direction of the vehicle seat. It is particularly advantageous here for an actuator 25 to be actuated thereby, by means of which the corresponding movement can be compensated for.

It is therefore conceivable to use three cardanic suspensions that each have one rotary element 9, each cardanic suspension only allowing movement in a single spatial direction L, H, B, each of these cardanic suspensions being connected, at least in terms of signals, to an actuator 25 acting in the corresponding spatial direction L, H, B. Therefore, three cardanic suspensions are provided here, which are each connected to an actuator 25, each of which act in just one spatial direction.

Furthermore, the use of a cardanic suspension that is only movable in one spatial direction L, H, B is particularly advantageous if the vehicle seat is only intended to be stabilized in one direction, for example in a vertical direction H. The structural complexity can thus be considerably reduced.

This signal can be transmitted to a control unit 28 by means of a line 27, which unit then transmits the corresponding commands to the actuator 25.

Here, the actuator 25 may be electrically, hydraulically or pneumatically activated. The actuator 25 is actuated such that each detected movement can be counteracted, so that the vehicle seat 1 is stabilized.

The actuator 25 is preferably arranged on the second suspension element 12 and acts on the first suspension element 11 in order to counteract a rotational movement 20 due to a force 17 applied.

All the features disclosed in the application documents are claimed as being essential to the invention provided that, individually or in combination, they are novel over the prior art.

LIST OF REFERENCE SIGNS

1, 1', 1" vehicle seat
2, 2', 2" vehicle body
3 spring apparatus
4 damping apparatus
5 vertical direction
6 horizontal direction
7 seat stabilization apparatus
8 first rotational axis
9, 9', 9" rotary element
10, 10', 10" second rotational axis
11, 11', 11" first suspension element
12, 12', 12" second suspension element
13 housing
14 holder
15 seat part
16 backrest part
17 force applied
18 uneven terrain
19 third rotational axis
20 rotational movement due to force
21 rotational pulse vector
22 rotational movement due to torque
23 deflection without seat stabilization apparatus
24 deflection with seat stabilization apparatus
25 actuator
26 cardanic suspension
27 line
28 control unit
L longitudinal direction
H vertical direction
B width direction

What is claimed is:

1. A vehicle seat arranged on a vehicle body and movable relative to the vehicle body, comprising:
   at least one of a spring apparatus and a damping apparatus for displacing and for absorbing oscillations in at least one of a vertical and a horizontal direction, and
   at least one seat stabilization apparatus arranged on the vehicle seat for stabilizing the vehicle seat in the at least one of the vertical and the horizontal direction,
      wherein the seat stabilization apparatus includes at least one rotary element that is mounted so as to rotate about a first rotational axis at a rotational frequency and by means of which a torque is generated that counteracts a force acting from outside on the vehicle seat, wherein the generated torque counteracts a rotational movement of at least one of the vehicle seat and the vehicle body generated by the force about at least one of an actual and an imaginary second rotational axis, wherein in a first operating mode the rotary element rotates about the first rotational axis at a first rotational frequency, and wherein in a second operating mode the rotary element is stationary.

2. The vehicle seat according to claim 1, wherein the vehicle seat is arranged on a first suspension element which is rotatably mounted relative to a second suspension element by means of the second rotational axis, and the second rotational axis is arranged so as to extend in the width direction of the vehicle seat.

3. The vehicle seat according to claim 2, wherein the first rotational axis and the second rotational axis are oriented perpendicularly to one another and intersect at a point.

4. The vehicle seat according to claim 2, wherein the at least one of the spring apparatus and the damping apparatus are connected both to the first suspension element and to the second suspension element.

5. The vehicle seat according to claim 1, wherein the rotational frequency of the rotary element can be adjusted.

6. The vehicle seat according to claim 1, wherein the first rotational axis has a fixed position relative to the vehicle seat.

7. The vehicle seat according to claim 1, wherein the rotary element is arranged in the seat stabilization apparatus by means of a cardanic suspension.

8. The vehicle seat according to claim 7, wherein the movement of the rotary element can be detected in any spatial direction in the cardanic suspension due to the torque generated.

9. The vehicle seat according to claim 8, wherein the detected movement of the rotary element is transmitted to at least one actuator, by means of which the rotational movement of the vehicle seat can be counteracted.

10. The vehicle seat according to claim 1, wherein the first rotational axis and the second rotational axis are oriented perpendicularly or in parallel with one another.

11. The vehicle seat according to claim 1, wherein in the second operating mode the rotary element does not generate a torque that counteracts a force acting from outside on the vehicle seat.

12. A vehicle seat arranged on a vehicle body and movable relative to the vehicle body, comprising:
   at least one of a spring apparatus and a damping apparatus for displacing and for absorbing oscillations in at least one of a vertical and a horizontal direction, and
   at least one seat stabilization apparatus arranged on the vehicle seat for stabilizing the vehicle seat in the at least one of the vertical and the horizontal direction,
      wherein the seat stabilization apparatus includes at least one rotary element that is mounted so as to rotate about a first rotational axis at a rotational frequency and by means of which a torque is generated that counteracts a force acting from outside on the vehicle seat, wherein the generated torque counteracts a rotational movement of at least one of the vehicle seat and the vehicle body generated by the force about at least one of an actual and an imaginary second rotational axis, wherein in a first operating mode the rotary element rotates continuously about the first rotational axis at a first rotational frequency.

13. The vehicle seat according to claim 1, wherein the first rotational axis is perpendicular to the second rotational axis.

14. A vehicle seat arranged on a vehicle body and movable relative to the vehicle body, comprising:
   at least one of a spring apparatus and a damping apparatus for displacing and for absorbing oscillations in at least one of a vertical and a horizontal direction, and
   at least one seat stabilization apparatus arranged on the vehicle seat for stabilizing the vehicle seat in the at least one of the vertical and the horizontal direction,
   wherein the seat stabilization apparatus includes at least one rotary element that is mounted so as to rotate about a first rotational axis at a rotational frequency and by means of which a torque is generated that counteracts a force acting from outside on the vehicle seat, wherein the generated torque counteracts a rotational movement of at least one of the vehicle seat and the vehicle body generated by the force about at least one of an actual and an imaginary second rotational axis, and wherein the rotary element is arranged in the seat stabilization apparatus by means of a cardanic suspension.

15. The vehicle seat according to claim 14, wherein the vehicle seat is arranged on a first suspension element which is rotatably mounted relative to a second suspension element by means of the second rotational axis, and the second rotational axis is arranged so as to extend in the width direction of the vehicle seat.

16. The vehicle seat according to claim 15, wherein the first rotational axis and the second rotational axis are oriented perpendicularly to one another and intersect at a point.

17. The vehicle seat according to claim 15, wherein the at least one of the spring apparatus and the damping apparatus are connected both to the first suspension element and to the second suspension element.

18. The vehicle seat according to claim 14, wherein the rotational frequency of the rotary element can be adjusted.

19. The vehicle seat according to claim 14, wherein the first rotational axis has a fixed position relative to the vehicle seat.

* * * * *